United States Patent
Pappu et al.

(10) Patent No.: US 12,397,479 B2
(45) Date of Patent: Aug. 26, 2025

(54) PROCESS FOR MAKING A GLOSSY FINISH SANDWICH COMPOSITE

(71) Applicant: COUNCIL OF SCIENTIFIC AND INDUSTRIAL RESEARCH, New Delhi (IN)

(72) Inventors: Asokan Pappu, Bhopal (IN); Manoj Kumar Gupta, Bhopal (IN); Alka Mishra, Bhopal (IN); Edward Peters, Bhopal (IN); Ajay Kulshreshth, Bhopal (IN); Sanjai Kumar Singh Rathore, Bhopal (IN); Avanish Kumar Srivastava, Bhopal (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 1057 days.

(21) Appl. No.: 17/312,780

(22) PCT Filed: Aug. 16, 2019

(86) PCT No.: PCT/IN2019/050599
§ 371 (c)(1),
(2) Date: Jun. 10, 2021

(87) PCT Pub. No.: WO2020/121319
PCT Pub. Date: Jun. 18, 2020

(65) Prior Publication Data
US 2022/0048226 A1  Feb. 17, 2022

(30) Foreign Application Priority Data
Dec. 14, 2018  (IN) .............................. 201811047389

(51) Int. Cl.
*B29C 43/14*  (2006.01)
*B29C 43/18*  (2006.01)
(Continued)

(52) U.S. Cl.
CPC ............ *B29C 43/146* (2013.01); *B29C 43/18* (2013.01); *B29C 44/1209* (2013.01);
(Continued)

(58) Field of Classification Search
CPC .............................. B29C 43/146; B29C 43/18
See application file for complete search history.

(56) References Cited

U.S. PATENT DOCUMENTS 3,810,798 A * 5/1974 McCoy ..................... E04C 2/16
156/244.11
4,207,282 A * 6/1980 Grisch ................... B29C 70/46
264/113

(Continued)

FOREIGN PATENT DOCUMENTS

CN  103849018 A  6/2014
CN  106947229 A  7/2017

(Continued)

OTHER PUBLICATIONS

Indian Examination Report, mailed May 23, 2022, from India Patent Application No. 201811047389.
(Continued)

*Primary Examiner* — Edmund H Lee
(74) *Attorney, Agent, or Firm* — Workman Nydegger

(57) ABSTRACT

The present invention provides a glossy finish sandwich composite, comprising face sheet as skin element and a core element; wherein, the skin element is a composite selected from the group consisting of inorganic industrial waste particulates reinforced polymeric composite; fibres reinforced polymeric composite; and fibres and particulate reinforced hybrid polymer composite; wherein, the core element is selected from the group consisting of polyurethane foam and wastes reinforced polymeric material. The present invention also provides a novel process for developing
(Continued)

glossy finish high performance hybrid sandwich composite(s). Moreover, the sandwich composite(s) of the present invention are unique materials which have versatile applications in wider spectrum of utility in sustainable manner and address issues on waste management, effective utilisation of renewable resources and agro-wastes.

7 Claims, 3 Drawing Sheets

(51) Int. Cl.
| | |
|---|---|
| B29C 44/12 | (2006.01) |
| B29C 44/42 | (2006.01) |
| B29C 45/14 | (2006.01) |
| B29C 70/02 | (2006.01) |
| B29C 70/48 | (2006.01) |
| B29K 75/00 | (2006.01) |
| B29K 105/26 | (2006.01) |
| B29L 7/00 | (2006.01) |

(52) U.S. Cl.
CPC ........ *B29C 44/42* (2013.01); *B29C 45/14508* (2013.01); *B29C 70/021* (2013.01); *B29C 70/48* (2013.01); *B29K 2075/00* (2013.01); *B29K 2105/26* (2013.01); *B29L 2007/002* (2013.01)

(56) References Cited

U.S. PATENT DOCUMENTS

| | | | |
|---|---|---|---|
| 6,156,811 A | 12/2000 | Lammeck et al. | |
| 6,564,521 B1 | 5/2003 | Brown et al. | |
| 6,605,650 B1 | 8/2003 | Roth | |
| 7,007,433 B2 * | 3/2006 | Boyer | E04C 2/292 52/592.1 |
| 2009/0236765 A1 | 9/2009 | Kessing | |
| 2015/0300019 A1 | 10/2015 | Li et al. | |

FOREIGN PATENT DOCUMENTS

| | | |
|---|---|---|
| EP | 3260587 A1 | 12/2017 |
| WO | WO0198064 | * 12/2001 |

OTHER PUBLICATIONS

International Search Report and Written Opinion from PCT/IN2019/050599 filed Aug. 16, 2019, mailed Dec. 9, 2019.

Doddamani, M.R. et al., "Compressive properties of sandwiches with functionally graded rubber core and jute-epoxy skins", Bulletin of Materials Science, Indian Academy of Sciences, vol. 36, No. 2, May 4, 2013, pp. 319-328.

Pappadà, S. et al., "Processing, mechanical properties, and interfacial bonding of a thermoplastic core-foam/composite-skin sandwich panel", Advances in Polymer Technology, (2010) vol. 29 No. 3, pp. 137-145.

Mongkollapkit et al., "Mechanical and morphological properties for sandwich composites of wood/PVC and glass fiber/PVC layers", Journal of Applied Polymer Science, (2010) vol. 116, pp. 3427-3436.

P. Asokan et al., "Recent Advances on Fly ash Particulates and Biofiber Reinforced Lightweight Hybrid Sandwich Composites", International Journal of Engineering Research and Technology, Oct. 2013, vol. 2, Issue 10, pp. 2914-2923.

H. T. Draghicescu et al., "Thermomechanical response of a thin sandwich composite structure", Engineering Letters (2010) vol. 18, No. 3 08.

Ori Ishai, et al., "Long-term hygrothermal effects on damage tolerance of hybrid composite sandwich panels", Composites. (1995), vol. 26, No. 1, pp. 47-55.

Rao, R. Vijayalakshmi et al., "Behavior of sandwich composites under flexural and fatigue loadriing: effect of variation of core density", International Journal of Engineering Science and Technology, Oct. 2011, vol. 3, No. 10, pp. 7598-7607.

Velmurugan, R. et al., "Mechanical properties of glass/palmyra fiber waste. sandwich composites", Indian Journal of Engineering & Materials Sciences, Dec. 2005, vol. 12, pp. 563-570.

Vijaykumar H. K., et al., "Experimental Investigation of the Tensile strength and Compressive strength of Fly Ash Core Sandwiched Composite Material", IOSR Journal of Engineering, Jun. 2014, vol. 4, pp. 1-10.

* cited by examiner

PROCESS FOR MAKING A GLOSSY FINISH SANDWICH COMPOSITE

FIELD OF THE INVENTION

The present invention relates to a glossy finish sandwich composite(s). More particularly, the present invention relates to a process for making high-performance lightweight glossy finish hybrid green sandwich composites with variable density using different industrial waste particulates, natural fibres/fabrics/textiles with polyurethane binder as core element/polymeric agro-wastes sheet as inner core materials. Preparation process describes a method for manufacturing green composites skin element with variable thickness using fibers (natural/plant fibres, glass fibre and/or textiles) and or with waste particulates (fly ash, marble waste, lime and gypsum rich wastes minerals, metallurgical, chemical, fertiliser industry wastes, polymeric waste) reinforced with epoxy/polyester/polyurethane resin single operation mode and a method for making moisture resistant glossy finish sandwich composites fabrication under injection moulding system followed by compression moulding system with a pressure of 180 kg/cm$^2$ at varying temperature of 38° C.-60° C. The specific applications of the sandwich composites are for building construction such as partition panels, wall panels, ceilings, beams and columns and transportation systems such as buses, trains, boat ships and aircrafts.

BACKGROUND OF THE INVENTION

Reference may be made to U.S. Pat. No. 6,605,650 B1 wherein a process of making lightweight, rigid polyurethane foam by forming a mixture of isocyanate, polyol reactants, catalyst and blowing agent including expandable polystyrene beads under the exothermic reaction at about 150° C. In the reported work, the density of the rigid foam and its corresponding tensile properties are not reported, the process know how is not as to that of the lightweight composites developed in the present invention. Moreover, the rigid polyurethane foam did not show moisture resistant properties and may not be useful to meet the materials performance to use as potential architectural interiors in building and transport system.

Lightweight composites are mostly made as sandwich components using glass or carbon fibre-reinforced thermoset polymer composite laminates or metal sheets as face sheets/skin materials with foam of polyurethane/polyethylene/polyvinylchloride/polystyrene/syntactic/honeycombs/light metals as inner core materials. (see, e.g. S. Pappadà et al. *Processing, mechanical properties, and interfacial bonding of a thermoplastic core-foam/composite-skin sandwich panel*, Advances in Polymer Technology, (2010) 29 137-145.; Mongkollapkit et al. *Mechanical and morphological properties for sandwich composites of wood/PVC and glass fiber/PVC layers*, J. App. Poly. Sci. (2010) 116, 3427-3436.; P. Asokan et al. *Recent Advances on Fly ash Particulates and Biofiber Reinforced Lightweight Hybrid Sandwich Composites*, Int. J. of. Engineering Research and Technology (2013) 2, 2914-2923). However, production of petroleum based fibres and polymers consume more energy and causes health hazards.

In sandwich composites, if the skin material is damaged, the core element sustains the composites temporarily only and sustainability of mechanical strength and moisture resistant of sandwich composite is major challenge. (see, e.g. H. T. Draghicescu et al, *Thermomechanical response of a thin sandwich composite structure*, Engineering Letters (2010) 18, 08; M. R. Doddamani, et al. *Compressive properties of sandwiches with functionally graded rubber core and jute-epoxy skins* Bull. Mater. Sci. (2013) 36, 319-328. O Ishai, et al., *Long-term hygrothermal effects on damage tolerance of hybrid composite sandwich panels* Composites. (1995), 26, 47-55. However, similar claim described in the U.S. Pat. No. 6,156,811, wherein the multi-step process for manufacturing sandwich structure involves core element and two skin elements namely face sheets placed at the each sides of the composite. The present invention overcome all issues in these process of fabrication and applications, where in customized sandwich structure claimed in the present invention even if the skin material is damaged, the core element would sustain the composites permanently and this is another unique features of this invention. Further, our invented sandwich composite materials shows moisture resistant properties and skin materials made from various waste particulates and natural fibres and polyurethane/polymeric agro-wastes are used as inner core materials.

The E glass vinyl ester polyurethane sandwich composites showed 1.63 to 2.48 MPa flexural strength with density of 1.0-3.0 g/cc (see, e.g. R. V. Rao et al. *Behavior of sandwich composites under flexural and fatigue loading: effect of variation of core density*. J. Eng. Sci. and Tech. (2011) 3 7598-7607). Sandwich composites of 5 mm thickness made out of glass/palmyra fiber waste using polyester resin showed tensile strength of 28 MPa, flexural strength of 42.2 MPa, but the moisture absorption of the composite was more than 9% and also sandwich composite was not light weight (see, e.g. R. Velmurugan et al. *Mechanical properties of glass/pylmyara fiber waste. sandwich composites*, Indian J. Engg & Mater Sci. (2005) 12 563-570). A comparison of density and tensile strength of our invented lightweight sandwich composite with other reported composite sheets is shown in FIG. 1 of drawing sheet. Manufacturing of such sandwich composites are time consuming, energy intensive, not does not involved simple process, and sandwich end products are not meeting the required quality to be used in the desired application especially for architectural interior in building and transport system. Very limited work have been reported universally on lightweight sandwich composites, however, reported lightweight sandwich composites did not meet the required mechanical characteristics and consumer requirement and acceptability due to ultra-light weight (see, e.g. P. Asokan et al. *Recent Advances on Fly ash Particulates and Biofiber Reinforced Lightweight Hybrid. Sandwich Composites*, Int. J. of. Engineering Research and Technology (2013) 2, 2914-2923; H. T. Draghicescu et al., *Thermomechanical Response of a Thin Sandwich Composite Structure*, Engineering Letters (2010) 18, 08; M. R. Doddamani, et al., *Compressive properties of sandwiches with functionally graded rubber core and jute-epoxy skins* Bull. Mater. Sci. (2013) 36, 319-328).

Present invention describes a method for fabricating moisture resistant lightweight glossy finish sandwich composite using skin/face element fabricated using various waste particulates and natural fibres/textiles reinforced with epoxy/polystyrene/polyurethane resin and polyurethane binder system as core materials under two stage operation mode and also describe a method to prepare high strength sandwich composite using polymeric agro-waste sheet as inner core materials.

Reference may be made in US patent NO. US 2015/0300019 A1, wherein a sandwich panel with a ductile hybrid core comprising tubular reinforcements was reported, in the fabrication process, metal, alloy, shape memory alloy, ceramic, composites, polymer or polymeric in the form of milli-tubes/micro-tubes as reinforce materials are used. No water absorption and surface finish properties are mentioned. Moreover, the present invention describes a method for fabricating moisture resistant lightweight glossy finish sandwich composite using various waste particulates and natural fibres/textiles reinforced with epoxy/polyester/polyurethane resin based green composite sheet as skin element as polyurethane as core element.

Reference may be made in US patent No. U.S. Pat. No. 6,564,521B1, wherein a method for making structural sandwich panels using polyurethane foam is reported. The sandwich panel contained metal, plywood, oriented strand board (OSB) or other lightweight material as face element. However, there was no report on the moisture absorption, glossy finish and mechanical strength of the sandwich composites. Further, the present invention describes a method for fabricating moisture resistant lightweight glossy finish sandwich composite using various waste particulates and natural fibres/textiles reinforced with epoxy/polyester/polyurethane resin based green composite sheet as skin/face element and polyurethane binder as inner core element and high strength sandwich sheet using polymeric agro-waste sheet as inner core materials. Sandwich composite prepared using fly ash and epoxy and woven glass fabric as reinforced skin material exhibited high density 1.36-1.43 g/cc and tensile strength up to 24 MPa only, (See, e.g. Vijaykumar H. K., et al Experimental Investigation of the Tensile strength and Compressive strength of Fly Ash Core Sandwiched Composite Mate, IOSR Journal of Engineering, (2014), 4 1-10. However, present invention describes a method for fabricating moisture resistant lightweight glossy finish sandwich composite using various waste particulates (such as marble waste, granite waste, fly ash, jerosite etc.) and natural fibres/textiles reinforced with epoxy/polyester/polyurethane resin based green composite sheet as skin/face element and polyurethane binder as core element.

Universally no simple process are available for the development of lightweight and glossy finish decorative moisture resistant sandwich high performance composites with variable density in two stage operation mode using particulates/fibres and particulates-fibres reinforced sheet as skin/face materials. No work is reported for the development of high strength sandwich composites using a polymeric agro-waste sheet as inner core materials. No work is reported for the development of composites with variable density with excellent surface finish, decorative finish, colors with good mechanical properties which has potential to use as an alternative to wood, plastic and FRP/GRP products for application as false ceiling, wall panels, partitions, furniture for building construction industry, consumer goods, architectural materials for transport system and other infrastructure development.

There were several constraints associated with composites developed earlier by many researchers, (i) the density was higher (ii) materials did not meet all required mechanical properties (ii) reported sandwich composite did not showed good aesthetic properties/glossy finish, (iv) materials did not meet required water absorption as per user requirement and specifications, (iv) skin element and core materials were not good enough to resist natural weathering (v) materials were not resistant to water, (vi) composite materials were not derived from the renewable/waste resources.

OBJECTIVE OF THE INVENTION

The main objective of the present invention is to make moisture resistant high-performance glossy finish hybrid green sandwich composites with variable density using industrial waste particulates, natural fibres/fabrics/textiles and various polymers for multifunctional applications in wide spectrum as an alternative to timber, plastic and FRP/GRP products.

Another objective of the present invention is to fabricate lightweight and glossy finish sandwich composites useful for broad application spectrum as architectural materials, as false ceiling, partitions, wall panel, furniture, materials for construction of, work bench, instant house, building interiors and infrastructure materials for application in airport, shopping complex, public utility centres and other transport system (train, bus, car, ship, aircraft).

Another objective of the present invention is to effectively utilize the different industrial wastes particulates (fly ash, mineral, mining, metallurgical, chemical and fertiliser industry wastes, marble and granite industry, FRP/GRP processing wastes) as filler, additives, catalyst, binder to fabricate surface finish skin/face element components for the development of environmental friendly, lightweight/high strength glossy finish high performance hybrid green composites Another objective of the present invention is to recycle industrial wastes particulates (marble, granite, fly ash, red mud and other minerals residues) as filler, binder and as a surface finish and decorative components for the development of lightweight sandwich hybrid green composites using polyurethane as core constituents for structural application.

Still, another objective of the present invention is to develop glossy finish skin/face element green composites, using short/textile fibres (glass/carbon/sisal/jute/armid/banana/hemp/flax/cotton fibres or any other fibres) reinforced with epoxy/polyester resin binder system.

Yet another objective of the present invention is to develop lightweight, water resistance, termite and fungus free and glossy finish decorative composites skin/face element for sandwich composites as an architectural interiors in locomotive application and other transport system.

Still, another objective of the present invention is to develop glossy finish high strength decorative green composites, using industrial waste particulates (particulates arising from any type of waste stream) together with short/textile fibres (glass/carbon/sisal/jute/armid/banana/hemp/flax/cotton fibres or any other fibres) reinforced with epoxy/polyester resin binder system as skin/face element and polymeric-agro waste based materials/panels as a core element in making hybrid and high performance sandwich composites for structural application.

Yet, another objective of the present invention is to develop glossy finish high strength decorative green composites, using industrial waste particulates (particulates arising from any type of waste stream) together with short/textile fibres (glass/carbon/sisal/jute/armid/banana/hemp/flax/cotton fibres or any other fibres) reinforced with epoxy binder system as skin element and polymeric agro-waste materials such as paddy, wheat, maize straw, packaging wood, un-laminated particle board and un-laminated plywood reinforced with epoxy resin as core constituents in making sandwich composites for various applications.

Another objective of the present invention is develop the glossy finish sandwich composites with density varying from 0.4 g/cc to 2.58 g/cc with its corresponding tensile strength, tensile modulus, flexural strength, flexural modulus and water absorption in the range of 8.5-45 MPa, 250-2500 MPa, 6.5-45 MPa, 634-1250 MPa and 0.2-15%, respectively using waste particulates in epoxy resin system, with and without fibre reinforced skin element and polyurethane/polymeric agro-waste as core element.

SUMMARY OF THE PRESENT INVENTION

Accordingly, the present invention provides a glossy finish sandwich composite of density in the range of 0.4-2.58 g/cc, tensile strength in the range of 8.5-45 MPa and tensile modulus in range of 250-2500 MPa, having of face sheet as skin element and a core element;
wherein, the skin/face element is a composite selected from the group consisting of:
(i) inorganic industrial waste particulates reinforced polymeric composites;
(ii) fibres reinforced polymeric composite; and
(iii) fibres and particulate reinforced hybrid polymer composite; and
wherein, the core element is selected from the group consisting of polyurethane foam and wastes reinforced polymeric materials.

In an embodiment the polymer of skin/face element is selected from the group consisting of epoxy resin, polyester resin and polyurethane resin.

In another embodiment the inorganic industrial waste particulates are selected from the group consisting of marble waste, fly ash, lime, gypsum rich wastes mineral, metallurgical, chemical, fertiliser wastes, glass fibre reinforced plastic (GRP) waste and silica fume waste and the fibres are natural fibres or synthetic fibres selected from the group consisting of sisal fibre, jute fibre, banana fibre, flax, cotton, hemp fibres and synthetic fibres/textiles.

In another embodiment the wastes reinforced polymeric materials are selected from the group consisting of paddy straw, wheat straw, maize straw, packaging wood, un-laminated particle board and un-laminated plywood, reinforced with epoxy, polyester or polyurethane binder.

The present invention provides a process for making glossy finish sandwich composite, comprising the steps of:
a. dry and wet processing of industrial waste particulates waste particulates are selected from the group consisting of marble waste, fly ash, lime, gypsum rich wastes mineral, metallurgical, chemical, fertiliser wastes, glass fibre reinforced plastic (GRP) waste and silica fume waste for particulates based outer skin/face sheet and/or dry and wet processing of chopped natural fibres and synthetic fibres selected from the group consisting of sisal fibre, jute fibre, banana fibre, flax, cotton, hemp fibres and synthetic fibres/textiles followed by hot air curing for fibres based skin/face materials sheet;
b. homogeneous mixing of processed waste particulates and/or processed fibre with polymer selected from the group consisting of epoxy resin, polyester and polyurethane resin along with catalyst to prepare glossy finish reinforced polymeric skin/face composite material;
c. casting under compression moulding of the glossy finish reinforced polymeric skin/face composite material;
d. demoulding of glossy finish reinforced polymeric skin/face composite sheet;
e. natural and or hot air oven curing of skin/face composite sheet of step d;
f. injection moulding of polyurethane foam or compressive moulding of agro wastes reinforced polymeric materials as inner core material to obtain glossy finish sandwich composite;
g. casting under compression moulding of glossy finish sandwich composite and
h. demoulding and hot air oven curing of the glossy finish sandwich composite.

In an embodiment, the industrial waste particulates are processed using hot water, mechanical grinding and hot air oven curing at 60–80° C. for 2-24 hours, and the processed waste particulates have final size in the range of 2.0-200 μm, density in the range of 0.85-1.87 g/cc, porosity in the range of 30-68% and water holding capacity in the range of 25 to 110%, and the fibres are processed using hot water and hot air curing at 60-105° C. for 2-24 hours and the processed fibre have density in the range of 1.25-1.45 g/cc, elongation in the range of 0.3-5.0%, tensile strength in the range of 250-650 MPa and Young's modulus in the range of 5-35 GPa.

In an embodiment, the processed waste particulates and/or processed fibre are homogeneously mixed with the polymer at a volume ratio ranging from 50-80% and/or 15-35% to prepare reinforced polymeric skin/face composites material.

In an embodiment, the polymer of step b is epoxy resin and polyester resin, used in the volume ratio ranging from 15-35%, the catalysts are selected from methyl ethyl ketone peroxide (MEKP) and cobalt naphthenate (0.5-5%) and when the polymer of step b is polyurethane resin, used in the volume ratio ranging from 20-80%, the catalyst used is poly-isocyanate (0.5-5%).

In an embodiment, the step b) is performed at grinding rate of 400-4000 rpm to manufacture glossy finish reinforced polymeric skin/face composites material.

In an embodiment, the casting is performed at temperature in the range of 16±2° C.-75±2° C. and pressure in the range of 2-295 kg/cm$^2$ and hot air oven curing is performed at temperature in the range of 60-120° C. for 2-24 hours.

DETAILED DESCRIPTION OF THE INVENTION

Figure 1:
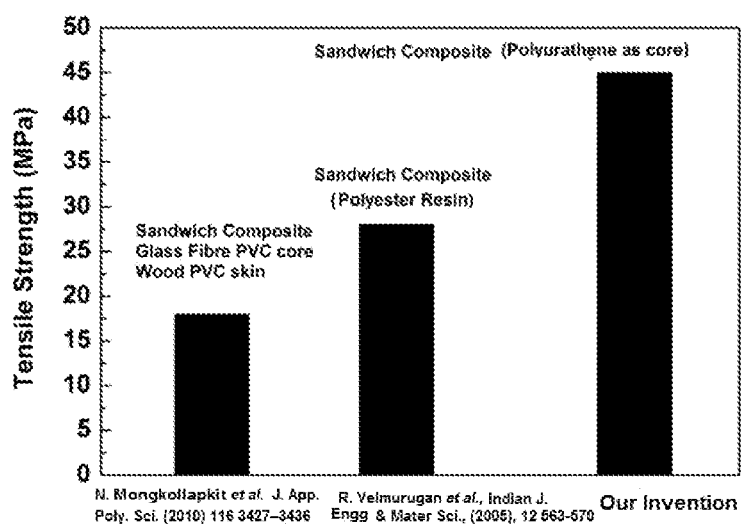
FIG. 1 depicts a comparison of tensile stress of the lightweight glossy finish green sandwich composite sheet of the present invention having polyurethane as core with the sandwich composite sheet having glass fibre PVC as core and wood PVA as skin, and the sandwich composite sheet of polyester resin.
Figure 2:
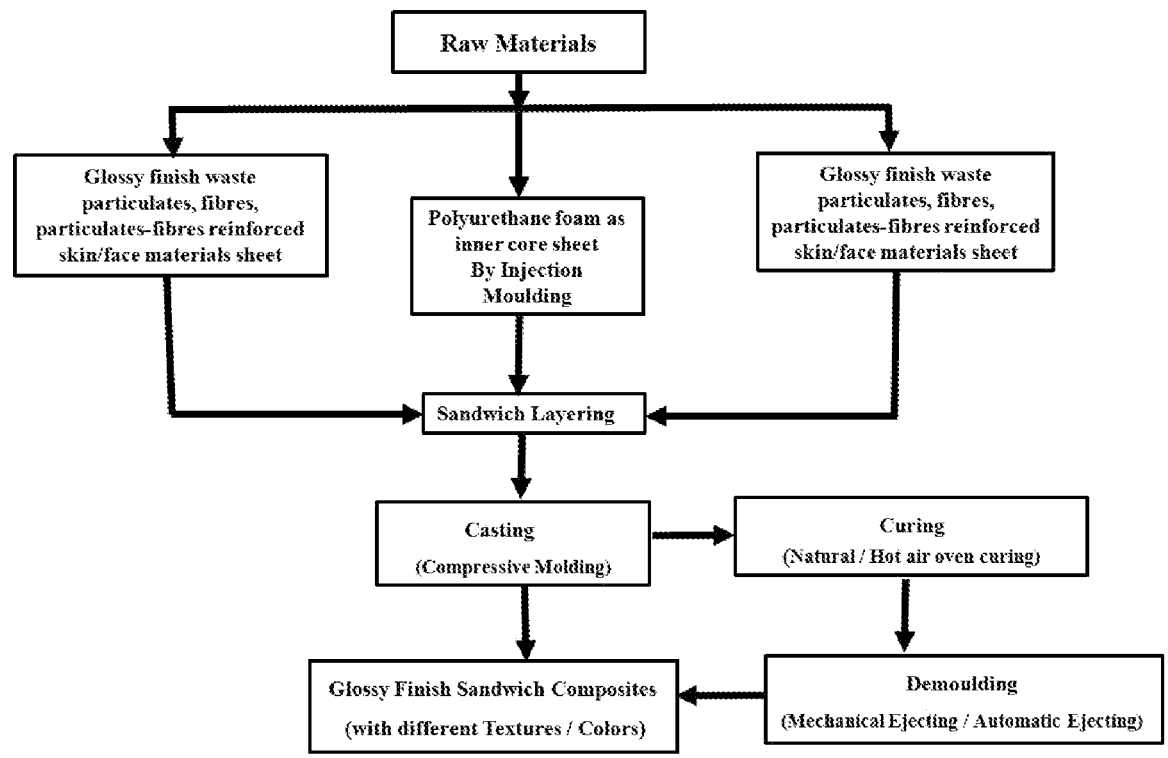
FIG. 2 depicts an explanatory flow diagram showing the manufacturing process of the glossy finish sandwich polymer composite sheets in two stage operation mode using polyurethane as inner core element.
Figure 3:
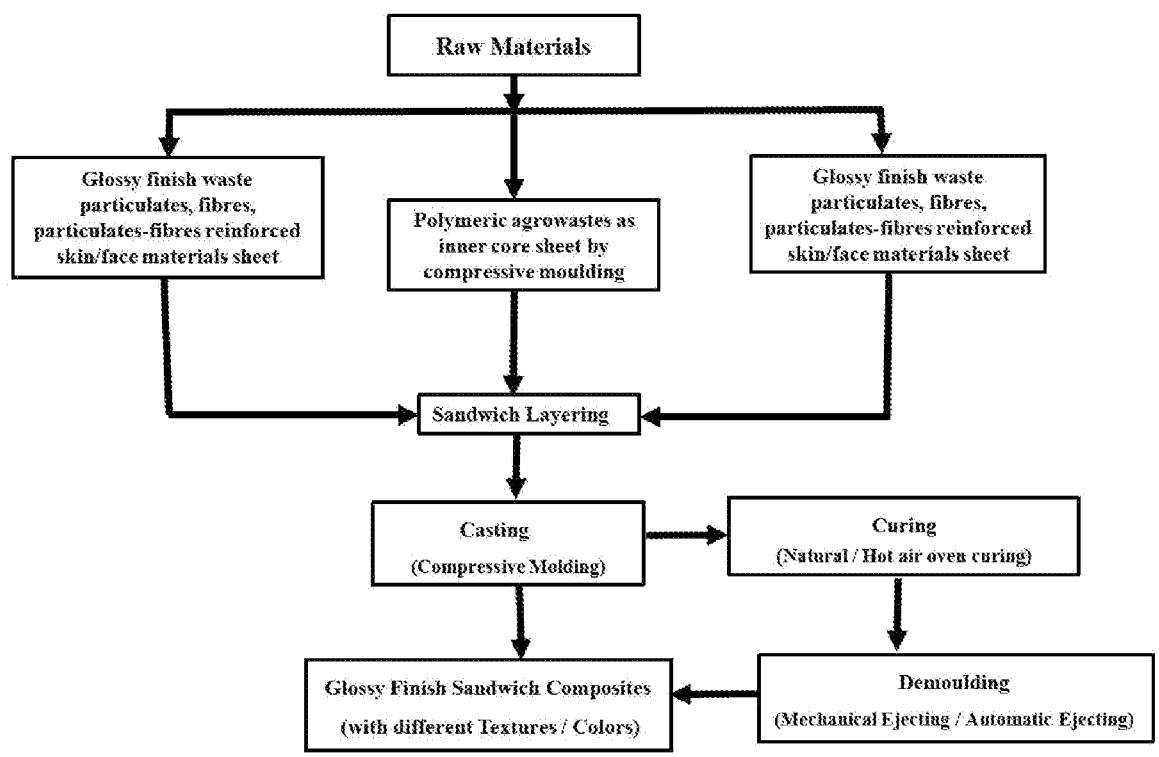
FIG. 3 depicts an explanatory flow diagram showing the manufacturing process of the glossy finish sandwich polymer composite sheets in two stage operation mode using polymeric agro-waste as inner core element.

Manufacturing of sandwich composite materials with variable water absorption and density from industrial waste particulates and renewable resources such as natural fibres/textiles is the one of the major challenges to meet the current and future demands of wood-alternative materials and fibre/glass reinforced polymer composites products. In the present invention, a making process of high performance glossy finish green hybrid lightweight sandwich composites sheets with variable density and mechanical strength using the industrial waste particulates (such as fly ash, red mud, zinc, copper, iron, steel, manganese industries, process residues released during excavation of ores, mineral, coal, mining and waste arising from agricultural sector, fertiliser industry, chemical industry, granite, marble, stone industry such as marble, granite and stone wastes, FRP/GRP, asbestos and plastic industries) and natural fibres such glass fibre, sisal fibre, pine apple fibre, jute fibre, banana fibre, flax, cotton, hemp fibres and synthetics fabrics/textiles composites sheets reinforced with epoxy/polyester resin as skin/face element and polyurethane as core materials.

Moreover, the present invention relates to a simple process for the manufacturing lightweight high performance glossy finish sandwich hybrid composites sheet up to dimension of 220×120 cm with variable thickness, under two stage operation using epoxy/polyester resin based natural fibres and or waste particulates based hybrid composite sheets as glossy finish skin/face element materials and polyurethane foam as core materials under injection moulding machine followed by compression moulding machine at varying temperature of 38±2° C.-60±2° C. with pressure of 180 kg/cm$^2$ followed by hot air oven curing at 60–120° C. temperature for 2-24 hours. The resulted density of sandwich composites are varying from 0.4-1.45 g/cc with its corresponding tensile strength, tensile modulus of 8.5-45 MPa and 250-2500 MPa, respectively.

Moreover, the present invention relates to a simple process for the making high performance glossy finish sandwich hybrid composites sheet up to dimension of 220×120 cm with variable thickness, under two stage operation natural fibres and or waste particulates based hybrid composite sheets reinforced with epoxy/polyester resin as glossy finish skin/face element materials and polymeric agro-waste (such as paddy, wheat, maize straw, sugarcane baggage reinforced with epoxy/polyester resin, packaging wood, un-laminated particle board and un-laminated plywood) as core materials under injection moulding machine followed by compression moulding machine at varying temperature of 38±2° C.-60±2° C. with pressure of 180 kg/cm$^2$ followed by hot air oven curing at 60-120° C. temperature for 2-24 hours. The resulted density of sandwich composites are varying from 0.77-2.48 g/cc with its corresponding tensile strength, tensile modulus of 12-35 MPa and 320-2200 MPa, and its corresponding flexural strength and modulus was in range of 21-34 MPa and 700-1250 MPa respectively.

The present invention deals with a simple process for the manufacturing high strength glossy finish sandwich composites under two stage operation, wherein the skin/face element are fabricated using industrial waste particulates (20-80%) in epoxy/polyester/polyurethane binder system and polyurethane foam as core materials is used. Sandwich composites exhibited a density ranging from 0.4-1.45 g/cc with its corresponding tensile strength, tensile modulus, flexural strength and flexural modulus in the range of 8.5-45 MPa, 250-2500 MPa, 6.5-45 MPa and 650-1250 MPa, respectively.

The present invention deals with a simple process for the manufacturing high strength glossy finish sandwich composites under two stage operation, wherein the skin/face element are fabricated using natural fibres/textiles such sisal fibres, jute fibres, banana fibres as (20-80%) in epoxy/polyester/polyurethane binder system and core materials as polyurethane foam under two stage operation system. The high performance sandwich composites exhibits a density ranging from 0.4-1.45 g/cc with its corresponding tensile strength, tensile modulus, flexural strength and flexural modulus in the range of 8.5-45 MPa, 250-2500 MPa, 6.5-45 MPa and 650-1250 MPa, respectively.

The present invention deals with a simple process for the manufacturing high strength glossy finish sandwich composites under two stage operation, wherein the skin/face materials element are fabricated using combination of industrial waste particulates (20-80%) and natural fibres/textiles such as sisal fibres, jute fibres, banana fibres (2-15%) in epoxy/polyester/polyurethane binder system and polyurethane foam as core materials under two stage operation system.

The present invention deals with a simple process for the manufacturing high strength glossy finish sandwich composites under two stage operation, wherein the skin/face materials element are fabricated with or without combination of industrial waste particulates (20-80%) and natural fibres/textiles such as sisal fibres, jute fibres, banana fibres (2-15%) in epoxy/polyester/polyurethane binder system and polymeric agro-waste (such as paddy, wheat, maize straw reinforced with epoxy/polyester/polyurethane binder and packaging wood, un-laminated particle board and un-laminated plywood) as core materials is used under two stage operation system.

The raw materials used in making skin element composites and core element materials are substantially and widely available from different industrial sites and which are generated through process of materials/minerals and agricultural sites. These skin elements composites can be prepared either with particulates or with particulates and fibres under compression moulding system in closed mould in single operation mode. It is possible to make specific components of desired dimension and thickness under injection moulding system. The potential applications of composites are architectural interiors in building construction sector and transport system including locomotives (rail coach sleeper bed plank, interiors, seat back board, support panels, flooring, false ceiling and partition panels, toilet doors and panels). Findings of the work done potentially exploit the use of unutilised plant fibres as partial substitute to glass fibre as skin/face element and agro-waste such as (such as paddy, wheat, maize straw reinforced with epoxy/polyester/polyurethane binder) as core materials composites as engineering materials.

Utilisation of natural/cellulosic fibre has shown considerable progress in recent years in the area of polymer composites due to its biodegradable and renewability, and their technical and social advantages. The polymeric composite properties highly depend on fibre and matrix system, performance of individual components, fillers and their interfacial compatibility with the resin. Industrial waste particulates are naturally wasted resource which has potential for use as a reinforcing particulates and filler and catalyst in polymer matrix composites. Universally, more than 20 billion tons of such waste particulates have been annually produced and India alone produces more than one billion tonnes of solid wastes.

To fabricate the skin materials for sandwich composites a wide range of industrial waste particulates used in the present invention consists of particles with the particle size varied from 2-200 μm. The chemical composition for sandwich composites present in the wide range of particulates were oxides of silica (2-60%), alumina (0.5-35%), iron (0.1-58%), calcium (1-28%) and magnesium (0.10-10%). Physical, Chemical and Mechanical properties of fibres characteristics of industrial waste particulates are as shown in Table l and Table 2.

TABLE 1

Physical characteristics of industrial waste particulates

| S. No | Physical Properties | Marble Wastes | Fly Ash | Granite Waste | Red Mud |
|---|---|---|---|---|---|
| 1 | Bulk density (g/cc) | 1.0-1.85 | 0.85-1.60 | 1.15-1.85 | 1.2-1.8 |
| 2 | Particle size (µm) | 10-150 | 5-200 | 10-150 | 5-150 |
| 3 | Specific gravity | 2.0-2.8 | 2.0-2.8 | 1.7-2.6 | 2.2-3.4 |
| 4 | pH | 6-9.5 | 4.5-12 | 6.5-9.5 | 4-12.5 |
| 5 | Porosity (%) | 35-50 | 30-65 | 35-65 | 45-65 |

TABLE 2

Mechanical properties of jute, sisal, and glass and jute fabric

| S. N | Parameters | Jute | Sisal | Glass | Jute Fabric |
|---|---|---|---|---|---|
| 1 | Density g/cc | 1.25-1.45 | 1.3-1.45 | 2.56 | 2.51 |
| 2 | Elongation (%) | 1.5-5.0 | 0.3-.75 | 4.5 | 19.27 ± 2.81 |
| 3 | Young's modulus (GPa) | 5-35 | 5.5-22.5 | 73.0 | 0.2 ± 0.01 |
| 4 | Tensile strength (MPa) | 300-650 | 250-650 | 2000 | 18.07 ± 1.30 |

Results revealed from the present invention that the sandwich composites made with skin materials which are fabricated using waste particulates with and without of natural fibres with epoxy/polyester/polyurethane binder system and polyurethane foam as core materials showed the density varying from 0.44 g/cc to 1.45 g/cc. The resultant tensile and tensile modulus was 8.5-45 MPa and 250-2500 MPa respectively. Incorporation of waste particulates improved the flexural strength and flexural modulus of composites as compared to without particulate reinforcement and their values are in the range of 6.5-45 MPa and 634-1120 MPa, respectively. It is apparent that skin materials made from particulates and fibre reinforced composite with polyurethane foam resulted in further low density composites with better mechanical properties.

Results revealed from the present invention that the sandwich composites made with skin materials which are fabricated using waste particulates with and without of natural fibres with epoxy/polyester/polyurethane binder system and polymeric agro-waste as core materials showed the density varying from 0.77 g/cc to 2.58 g/cc. The resultant tensile and tensile modulus was 12-35 MPa and 320-2200 MPa respectively. Incorporation of waste particulates improved the flexural strength and flexural modulus of composites as compared to without particulate reinforcement and their values are in the range of 21-34 MPa and 700-1250 MPa, respectively. It is apparent that skin materials from particulates and fibre reinforced composite with polyurethane foam resulted in further low density composites with better mechanical properties.

The findings of the present invention showed significant improvement in the mechanical properties of low density composites as compared to the work reported by others which for potential application of lightweight and stiff components for architectural interior in building and transport system. The utility of the concept developed in the present invention opened an avenue to potentially exploit the unutilised waste particulates and fibres in replacing glass fibres and other petroleum based fibres and composites for making skin materials and sandwich composites.

The glossy finish sandwich composites has remarkable scope in wide range of applications such as false ceiling, partition, acoustic construction panels, non load bearing walls as a architectural panels/partitions in construction industries, locomotive sectors and automotive sectors. Furthermore, these sandwich composites made with polyurethane as core materials with tuneable density are moisture resistant, free from insects, fungus, termite, and corrosion attack. The sandwich composite fabricate with core materials using polymeric agro-waste exhibits improved mechanical strength and an effective way to utilise agro-waste as high end product such as sandwich composites. The present invention has significant role for commercial exploitation in fibre reinforced composites and timber industries for sustainable development of wood substitute materials.

In an embodiment of the present invention, the glossy finish high performance sandwich composite with variable density and mechanical strength, fabricated using waste particulate with or without fibre reinforced with epoxy resin system composites sheet as skin element/materials and polyurethane foam as core materials. These skin materials for sandwich composites can be made either with particulates or with particulates and fibres under compression moulding system closed mould system in single operation mode followed by injection of polyurethane materials using injection moulding machine. Specific components of desired shape, dimension under injection moulding system can be possible. The potential applications of composites are architectural interiors in building construction sector and transport system including locomotives (rail coach sleeper bed plank, interiors, seat back board, support panels, flooring, false ceiling and partition panels, toilet doors and panels) and as skin materials for making sandwich structure.

In another embodiment of the present invention deals with the development of glossy finish decorative green composites using industrial waste particulates (particulates arising from any type of waste stream) together with or without short/textile fibres (glass/carbon/sisal/jute/armid/banana/hemp/flax/cotton fibres or any other fibres) reinforced with epoxy binder system as skin element (face sheet) and cost effective polymeric agro-waste based materials/panels or country wood rejected or short sized plank as a core element in making hybrid and high performance sandwich composites for structural applications. These composites skin element can be made either with particulates or with particulates and fibres or only using fibre/textile with epoxy resin system under compression moulding either in open mould or closed mould system. The potential applications of composites are architectural interiors in building construction sector and infrastructure.

The novelty of the present invention lies in making of lightweight sandwich composites with polyurethane foam as core materials, with variable density and mechanical strength as water resistant and termite free. Waste particulates and natural fibres reinforced composites sheets are used as skin materials. Polymeric agro waste based materials/panels based on agro-waste as core element is used in making hybrid and high performance sandwich composites for structural applications which are useful for multiple applications spectrum as alternative materials to timber, plastic and FRP/GRP products/materials.

Some of the terms used in the specification are defined below:

The term "Density" herein refers to the mass density of a substance and is defined as mass per unit volume. The density of hybrid sandwich composites in the present invention is tested as per the procedure prescribed in ASTM 792-08.

The term "Specific Gravity" herein refers to ratio of the density of a substance to the density of a reference substance; equivalently, it is the ratio of the mass of a substance to the mass of a reference substance for the same given volume.

Standard methods of analysis are employed in the present invention to measure bulk density, specific gravity of waste particulates following the method recommended by Veihmeyer & Hendrickson, 1946 as per the soil testing procedures.

Fibre-reinforced polymeric composite is a composite material made of a polymer matrix reinforced with fibres/fabric.

Particulate reinforced polymeric composite is composite materials made of polymer matrix reinforced with inorganic waste particulates.

Moulding is a process in which hybrid composite is prepared in a confined shape by applying pressure and heat.

Injection moulding is a process in which materials granules are melted down and injected into the mould cavity.

Compression moulding is a process in which hybrid composite is prepared in a confined shape by applying compressive pressure and heat.

Casting is a manufacturing process in which softens material is poured into a mould, which contains a hollow cavity of the desired shape, and then allowed to solidify.

Curing is a chemical process that produces the toughening or hardening of a polymer material by cross-linking of polymer chains, normally cured after releasing from the mould in natural room temperature as well as in oven.

Fabrication is the action or casting process of manufacturing of hybrid sandwich composites.

Tensile strength refers to maximum convention (Tensile) stress that can be sustained by the materials before failure and is calculated based on the load applied corresponding to its area.

The tensile modulus is commonly measured by taking the amount of stress applied to a material and dividing it by the strain the material undergoes. The tensile modulus is measured during material tensile testing using plot that has stress on the vertical axis and strain on the horizontal axis.

Tensile properties of hybrid sandwich composites of the present invention are tested according to ASTM D 638-10 using Universal Testing Machine (UTM), LRX Plus, Lloyd, UK. Young modulus and strain are calculated from the stress-strain data.

Water holding capacity is the total amount of water, materials can hold at field capacity. Water holding capacity is measured in saturated soil paste international pipette technique as well as Keen Box Method. The 24 hour water absorption of the manufactured polymer composite materials is determined in accordance with the ASTM D 570-8.

Particulate/particle size is the terms used to represent the dimensions of particles and waste/particulates. Particle size analysis of waste particulates are carried out using Laser Diffraction Particle size analyser (Model HELOS, Sympatec GMBH, Germany). Conductivity and pH is measured using Orion analyser (Model 1260, Orion Research Inc., USA) in a 1:2 solid:water suspension.

Fibre Elongation/elongation is the amount of extension or stretch that a fibre accepts. It is basically the difference between the original length and change in length. The fibre/fabric elongation is measured during tensile testing as per the standard protocol of ASTM D 5035-11 using Universal Testing Machine (UTM), 5 KN capacity, LRX Plus, Lloyd, UK.

Young's modulus or Young modulus is a mechanical property that measures the stiffness of a solid material, relation to its stress and strain.

Reinforced refers to a composites comprise a high-strength additive/waste particulates/fibres included with the virgin resin to improve its mechanical strength.

Flexural tests are performed according to ASTM D 790-10. Microstructure of the fracture surface of the hybrid composites is studied using Scanning Electron Microscope (SEM), Model JOEL JSM-5600 Japan. The hybrid sandwich composite fractured surfaces are sputter coated with a thin layer of gold to minimize the charging problem using JEOL-fine coat ion sputter.

Examples

Following examples are given by way of illustration and therefore should not be construed to limit the scope of the invention.

Geo-Graphical Location from where Each of the Biological Resources Used are as Follows

| S. No. | Name of biological resource | Source of access | Village/Panchayat | Town/Taluk | District | State |
|---|---|---|---|---|---|---|
| 1 | Paddy crop Straw | Farm | Deepdi | Bhopal | Bhopal | M.P. |
| 2 | Wheat crop Straw | Farm | Mungaliya Chhap | Bhopal | Bhopal | M.P |
| 3 | Maize crop Straw | Farm | Mungatiya Chhap | Bhopal | Bhopal | M.P |
| 4 | Sisal fibre | CSIR-AMPRI Farming land | Saket Nagar | Bhopal | Bhopal | MP |
| 5 | Jute fibre | Commercially available | Kharida main Road | Kharagpur, | Kharagpur, | WB |
| 6 | Hemp fibre | Commercially available | M.P Nagar | Bhopal | Bhopal | MP |
| 7 | Flax fibre | Commercially available | Govind pura | Bhopal | Bhopal | MP |
| 8 | Banana fibre | Commercially available | Sethumadai, | Pollachi | Coimbatore | TN |
| 9 | Coconut coir | Farm land | Thethakudi | Vedaraniam | Nagapattinam | Tamil Nadu |
| 10 | Ply wood board | Commercial market | MP Nagar | MP Nagar | Bhopal | M.P |
| 11 | Particle board | Commercial market | MP Nagar | MP Nagar | Bhopal | M.P |
| 12 | Packaging Wood | Commercial market | MP Nagar | MP Nagar | Bhopal | M.P |

Porosity is a measure of the void (i.e. "empty") spaces in a material, and is a fraction of the volume of voids over the total volume of materials. Porosity of waste particulates is tested as per the method prescribed by Bodman, 1942.

Example-1

Particulate Reinforced Composite Skin-Sheet Based Sandwich Composites

Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were used as reinforced materials. Polymer used to make glossy finish sheet was commercial grade epoxy/polyester/polyurethane resin. Methyl ethyl ketone peroxide (MEKP) and cobalt naphthenate were used as catalyst, Poly-isocyanate was used as catalyst for polyurethane resin. Industrial waste particulates used in these glossy finish skin materials composites have particle size in range of 2.0-75 μm, density of 0.85-1.87 g/cc, porosity of 30-68% and water holding capacity in range of 25 to 110%.

Process: Detailed laboratory experimental programme was conducted where in, to fabricate the skin/face materials sheet, a wide range of industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were processed and 50-80% of wastes were used alone or hybridization with other industrial wastes (one or in combination of two or more than two types of waste particulates) and they were homogeneously mixed with the epoxy/polyester resin based binder system using mechanical stirrer at room temperature and methyl ethyl ketone peroxide (MEKP) and cobalt naphthenate were used as catalyst (0.5-5%) for epoxy/polyester resin and poly-isocyanate was used as catalyst for polyurethane resin. A compression moulding machine was used to fabricate the glossy finish particulate reinforced polymer composite for skin materials. Casting and fabrication of the skin sheet was done at varying temperature of 16±2° C.-75±2° C. and at varying casting pressure from 2-95 kg/cm² in single operation mode. The fabricated glossy finish skin-sheets were cured in an oven at 60-120° C. for 2-24 hours. Pigment of about 0.2 to 0.5% of epoxy resin/polyester resin is used creates colour in skin composite sheet. Particulate reinforce polymer composites decorative sheets as fabricated used as outer cover/skin element to fabricate the sandwich composite. Sandwich composites were fabricated polyurethane under injection moulding and followed by compression moulding system with a pressure as high as 180 kg/cm² at temperature 38±2° C. to heating condition (60±2° C.). In lab scale experiment, size of the fabricated sandwich composite sheets was 32×22 cm. Up-scaling of glossy finish sandwich composite sheets was also done and glossy finish sandwich composite up to the dimension of 220 cm×120 cm with varying thickness of 6 mm, 9 mm, 12 mm, 19 mm, 25 mm, 30 mm and 50 mm were fabricated.

Example-2

Fibres Reinforced Composite Skin/Face Sheet Based Sandwich Composites

Raw Materials: Fibres such as glass fibre, sisal fibre, pine apple fibre, jutefibre, banana fibre, flax, cotton, hemp fibres were used as reinforced materials. Commercial grade bi-directional jute fabric [grams per square metre (GSM) of about 300 GSM] and chopped fabric with size of 2.0-45 mm were used. The polymer used to make glossy finish sheet was commercial grade epoxy/polyester/polyurethane resin. Methyl ethyl ketone peroxide (MEKP) and cobalt naphthenate were used as catalyst. Poly-isocyanate was used as catalyst for polyurethane resin. Fibers used to fabricate glossy finish skin materials have density in range of 1.25-1.45 g/cc, elongation in range of 0.3-5.0%, tensile strength of 250-650 MPa and Young's modulus in range of 5-35 GPa.

Process: Detailed laboratory experimental program was conducted to fabricate the fibres reinforced skin/face materials composites sheet for sandwich composites, where in a wide range of fibres (e.g. glass fibre, sisal fibre, pine apple fibre, jute fibre, banana fibre, flax, cotton, hemp fibres) were chemically processed and 15-35% ratio of fibre or chopped fibres/textile with size of 100 μm-5 cm were used alone or hybridization with other fibers (one type or in combination of 2 or more types of chopped fibre in one sheets) were homogeneously mixed with the epoxy/polyester resin based binder system using mechanical stirrer at room temperature and methyl ethyl ketone peroxide (MEKP) and cobalt naphthenate were used as catalyst (0.5-5%) for epoxy/polyester resin and poly-isocyanate was used as catalyst for polyurethane resin. A compression moulding machine was used to fabricate the glossy finish particulate reinforced polymer composite for skin materials. Casting and fabrication of the skin sheet was done at varying temperature of 16±2° C.-75±2° C. and at varying casting pressure from 2-95 kg/cm² in single operation mode. The fabricated glossy finish skin sheets were cured in an oven at 60-120° C. for 2-24 hours. Pigment of about 0.2 to 0.5% of epoxy resin/polyester resin is used creates colour in skin composite sheet. Particulate reinforce polymer composites decorative sheets as fabricated used as outer cover/skin element to fabricate the sandwich composite. Sandwich composites were fabricated polyurethane under injection moulding and followed by compression moulding system with a pressure as high as 180 kg/cm² at temperature 38±2° C. to heating condition (60±2° C.). In lab scale experiment, size of the fabricated sandwich composite sheets was 32×22 cm. Up-scaling of glossy finish sandwich composite sheets was also done and glossy finish sandwich composite up to the dimension of 220 cm×120 cm with varying thickness of 6 mm, 9 mm, 12 mm, 19 mm, 25 mm, 30 mm and 50 mm were fabricated.

Example-3

Particulate-Fibres Reinforced Composite Skin Sheet and Polyurethane as Core Element Based Sandwich Composites Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were used as reinforced materials. Fibres such as glass fibre, sisal fibre, pine apple fibre, jutefibre, banana fibre, flax, cotton, hemp fibres were used as reinforced materials. Commercial grade bi-directional jute fabric [grams per square metre (GSM) of about 300 GSM] and chopped fabric with size of 100 μm-5 cm were used. Polymer used to make glossy finish skin sheet was commercial grade epoxy/polyester/polyurethane resin. Methyl ethyl ketone peroxide (MEKP) and cobalt naphthenate were used as catalyst. Poly-isocyanate was used as catalyst for polyurethane resin. Industrial waste particulates used in these glossy finish skin materials sheet have particle size in range of 2.0-75 μm, density of 0.85-1.87 g/cc, porosity of 30-68% and water holding capacity in range of 25 to 110%. Fibers used in these glossy finish green fibre reinforced composites have density in range 1.25-1.45 g/cc, elongation in range of 0.3-5.0%, tensile strength of 250-650 MPa and Young's modulus in range of 5-35 GPa.

Process: Detailed laboratory experimental program was conducted to fabricate the fibres reinforced skin/face materials composites sheet for sandwich composites where in wide range of industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were processed and 50-80% of wastes were used as alone. Similarly, a wide range of fibres (e.g. glass fibre, sisal fibre, pine apple fibre, jutefibre, banana fibre, flax, cotton, hemp fibres) were chemically processed and 15-35% ratio of fibre or chopped fibres/textile with size of 100 μm-5 cm were used alone, and then both (particulates and fibers) were homogeneously mixed with the epoxy resin based binder system using mechanical stirrer at room temperature and methyl ethyl ketone peroxide (MEKP) and cobalt naphthenate were used as catalyst (0.5-5%). Calendaring of fabric/textile sheet was done over chopped natural fibres reinforced composite sheet. A compression moulding machine was used to fabricate the glossy finish skin/face sheet. Casting and fabrication of the composite sheet was done at varying temperature of 16±2° C.-75±2° C. and at varying casting pressure from 2-95 kg/cm$^2$ in single operation mode. The fabricated glossy finish skin sheets were cured in an oven at 60-80° C. for 2-24 hours. Pigment of about 0.2 to 0.5% of epoxy resin/polyester resin is used creates colour in composite sheet. The fabricated particulate-fibres reinforce polymer composites decorative sheets were used as outer cover/skin element to fabricate the sandwich composite. Sandwich composites were fabricated polyurethane under injection moulding and followed by compression moulding system with a pressure as high as 180 kg/cm$^2$ at temperature 38±2° C. to heating condition (60±2° C.). In lab scale experiment, size of the fabricated sandwich composite sheets was 32×22 cm. Up-scaling of glossy finish sandwich composite sheets was also done and glossy finish sandwich composite up to the dimension of 220 cm×120 cm with varying thickness of 6 mm, 9 mm, 12 mm, 19 mm, 25 mm, 30 mm and 50 mm were fabricated.

Properties: The following are the some of the measured properties of above described example 1-3 for glossy finish sandwich composites with polyurethane foam as core materials Density: 0.4-1.45 g/cc
Tensile Strength: 8.5-45 MPa
Tensile Modulus: 250-2500 MPa
Flexural Strength: 6.5-45 MPa
Flexural Modulus: 634-1120 MPa
Water Absorption: 0.10-1.26%

Example-4

Particulate Reinforced Composite Skin Sheet and Polymeric Agro-Waste as Core Materials Based Sandwich Composites Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were used as reinforced materials. Polymer used to make glossy finish sheet was commercial grade epoxy/polyester/polyurethane resin. Methyl ethyl ketone peroxide (MEKP) and cobalt naphthenate were used as catalyst, Poly-isocyanate was used as catalyst for polyurethane resin. Industrial waste particulates used in these glossy finish green skin materials have particle size in range of 2.0-75 μm, density of 0.85-1.87 g/cc, porosity of 30-68% and water holding capacity in range of 25 to 110%. Paddy, wheat, maize straw and sugarcane bagasse residues based polymeric sheet, packaging wood, un-laminated particle board and un-laminated plywood are used as inner core materials Process: Detailed laboratory experimental program was conducted where in, to fabricate the skin/face materials sheet, a wide range of industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were processed and 50-80% of wastes were used alone or hybridization with other industrial wastes (one or in combination of two or more than two types of waste particulates) and they were homogeneously mixed with the epoxy/polyester resin based binder system using mechanical stirrer at room temperature and methyl ethyl ketone peroxide (MEKP) and cobalt naphthenate were used as catalyst (0.5-5%) for epoxy/polyester resin and poly-isocyanate was used as catalyst for polyurethane resin. A compression moulding machine was used to fabricate the glossy finish particulate reinforced polymer composite for skin materials. Casting and fabrication of the skin sheet was done at varying temperature of 16±2° C.-75±2° C. and at varying casting pressure from 2-95 kg/cm$^2$ in single operation mode. The fabricated glossy finish skin sheets were cured in an oven at 60-120° C. for 2-24 hours. Pigment of about 0.2 to 0.5% of epoxy resin/polyester resin is used creates colour in skin composite sheet. Particulate reinforce polymer composites decorative sheets as fabricated used as outer cover/skin element to fabricate the sandwich composite. Sandwich composites were fabricated using polymeric pre-fabricated agro-waste composites (such as paddy, wheat, maize straw and sugarcane bagasse residues reinforced in epoxy/polyester resin system, packaging wood, un-laminated particle board and un-laminated plywood) by compression moulding system with a pressure as high as 180 kg/cm$^2$ at temperature 38±2° C. to heating condition (60±2° C.). In lab scale experiment, size of the fabricated sandwich composite sheets was 32×22 cm. Up-scaling of glossy finish sandwich composite sheets was also done and glossy finish sandwich composite up to the dimension of 220 cm×120 cm with varying thickness of 6 mm, 9 mm, 12 mm, 19 mm, 25 mm, 30 mm and 50 mm were fabricated.

Example-5

Fibres Reinforced Composite Skin/Face Sheet Based Sandwich Composites

Raw Materials: Fibres such as glass fibre, sisal fibre, pine apple fibre, jute fibre, banana fibre, flax, cotton, hemp fibres were used as reinforced materials. Commercial grade bi-directional jute fabric [grams per square metre (GSM) of about 300 GSM] and chopped fabric with size of 2.0-45 mm were used. The polymer used to make glossy finish sheet was commercial grade epoxy/polyester/polyurethane resin. Methyl ethyl ketone peroxide (MEKP) and cobalt naphthenate were used as catalyst. Poly-isocyanate was used as catalyst for polyurethane resin. Paddy, wheat, maize straw and sugarcane bagasse residues are used as core materials. Fibers used to fabricate glossy finish fibre skin materials have density in range of 1.25-1.45 g/cc, elongation in range of 0.3-5.0%, tensile strength of 250-650 MPa and Young's modulus in range of 5-35 GPa.

Process: Detailed laboratory experimental programme was conducted to fabricate the fibres reinforced skin/face materials composites sheet for sandwich composites, where in a wide range of fibres (e.g. glass fibre, sisal fibre, pine apple fibre, jute fibre, banana fibre, flax, cotton, hemp fibres) were chemically processed and 15-35% ratio of fibre or chopped fibres/textile with size of 100 µm-5 cm were used alone or hybridization with other fibers (one type or in combination of 2 or more types of chopped fibre in one sheets) were homogeneously mixed with the epoxy/polyester resin based binder system using mechanical stirrer at room temperature and methyl ethyl ketone peroxide (MEKP) and cobalt naphthenate were used as catalyst (0.5-5%) for epoxy/polyester resin and poly-isocyanate was used as catalyst for polyurethane resin. A compression moulding machine was used to fabricate the glossy finish particulate reinforced polymer composite for skin materials. Casting and fabrication of the skin sheet was done at varying temperature of 16±2° C.-75±2° C. and at varying casting pressure from 2-95 kg/cm² in single operation mode. The fabricated glossy finish skin sheets were cured in an oven at 60-120° C. for 2-24 hours. Pigment of about 0.2 to 0.5% of epoxy resin/polyester resin is used creates colour in skin composite sheet. Particulate reinforce polymer composites decorative sheets as fabricated used as outer cover/skin element to fabricate the sandwich composite. Sandwich composites were fabricated using polymeric pre-fabricated agro-waste composites (such as paddy, wheat, maize straw and sugarcane bagasse residues reinforced in epoxy/polyester resin system) by compression moulding system with a pressure as high as 180 kg/cm² at temperature 38±2° C. to heating condition (60±2° C.). In lab scale experiment, size of the fabricated sandwich composite sheets was 32×22 cm. Up-scaling of glossy finish sandwich composite sheets was also done and glossy finish sandwich composite up to the dimension of 220 cm×120 cm with varying thickness of 6 mm, 9 mm, 12 mm, 19 mm, 25 mm, 30 mm and 50 mm were fabricated.

Example-6

Particulate-Fibres Reinforced Composite Skin Sheet Based Sandwich Composites

Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were used as reinforced materials. Fibres such as glass fibre, sisal fibre, pine apple fibre, jute fibre, banana fibre, flax, cotton, hemp fibres were used as reinforced materials. Commercial grade bi-directional jute fabric [grams per square metre (GSM) of about 300 GSM] and chopped fabric with size of 100 µm-5 cm were used. Polymer used to make glossy finish skin sheet was commercial grade epoxy/polyester/polyurethane resin. Methyl ethyl ketone peroxide (MEKP) and cobalt naphthenate were used as catalyst. Poly-isocyanate was used as catalyst for polyurethane resin. Paddy, wheat, maize straw and sugarcane bagasse residues are used as core materials. Industrial waste particulates used in these glossy finish green hybrid composites have particle size in range of 2.0-75 µm, density of 0.85-1.87 g/cc, porosity of 30-68% and water holding capacity in range of 25 to 110%. Fibers used in these glossy finish green fibre reinforced skin materials composites have density in range 1.25-1.45 g/cc, elongation in range of 0.3-5.0%, tensile strength of 250-650 MPa and Young's modulus in range of 5-35 GPa.

Process: Detailed laboratory experimental program was conducted to fabricate the fibres reinforced skin/face materials composites sheet for sandwich composites where in wide range of industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were processed and 50-80% of wastes were used as alone. Similarly, a wide range of fibres (e.g. glass fibre, sisal fibre, pine apple fibre, jute fibre, banana fibre, flax, cotton, hemp fibres) were chemically processed and 15-35% ratio of fibre or chopped fibres/textile with size of 100 µm-5 cm were used alone, and then both (particulates and fibers) were homogeneously mixed with the epoxy resin based binder system using mechanical stirrer at room temperature and methyl ethyl ketone peroxide (MEKP) and cobalt naphthenate were used as catalyst (0.5-5%). Calendaring of fabric/textile sheet was done over chopped natural fibres reinforced composite sheet. A compression moulding machine was used to fabricate the glossy finish skin/face sheet. Casting and fabrication of the composite sheet was done at varying temperature of 16±2° C.-75±2° C. and at varying casting pressure from 2-95 kg/cm² in single operation mode. The fabricated glossy finish skin sheets were cured in an oven at 60-80° C. for 2-24 hours. Pigment of about 0.2 to 0.5% of epoxy resin/polyester resin is used creates colour in composite sheet. The fabricated particulate-fibres reinforce polymer composites decorative sheets were used as outer cover/skin element to fabricate the sandwich composite. Sandwich composites were fabricated using polymeric pre-fabricated agro-waste composites (such as paddy, wheat, maize straw and sugarcane bagasse residues reinforced in epoxy/polyester resin system) by compression moulding system with a pressure as high as 180 kg/cm² at temperature 38±2° C. to heating condition (60±2° C.). In lab scale experiment, size of the fabricated sandwich composite sheets was 32×22 cm. Up-scaling of glossy finish sandwich composite sheets was also done and glossy finish sandwich composite up to the dimension of 220 cm×120 cm with varying thickness of 6 mm, 9 mm, 12 mm, 19 mm, 25 mm, 30 mm and 50 mm were fabricated.

Properties: The following are the some of the measured properties of above described example 1-3 for glossy finish sandwich composites with polymeric agro-wastes as core materials Density: 0.77-2.58 g/cc
Tensile Strength: 12-35 MPa
Tensile Modulus: 320-2200 MPa
Flexural Strength: 21-34 MPa
Flexural Modulus: 700-1250 MPa
Water Absorption: 0.3-15%

For all above composites as described in examples (1-8), physical and mechanical properties of skin element (PRPC, FRPC and FPRPC sheets) as well as hybrid sandwich composites were tested according to ASTM D 638 standard using ultimate tensile testing machine (UTM), LRX Plus, Lloyd, UK. Tensile modulus and strain rate were tested and recorded from the stress-strain data. Flexural test were performed according to ASTM D790. Microstructure of the fractured surface (tensile fracture) of the hybrid sandwich composites was studied using Field Emission Scanning Electron Microscope (FESEM) to understand the bonding between skin and core materials for assessing and understanding the possible application potentials.

Advantages of the Invention

The various advantages of the present process are given below.
1. Development of moisture resistant glossy finish new class of green sandwich composite materials that is not yet developed anywhere in the world.
2. Development of sandwich composite of required and variable specific density for specific applications.
3. Development of high performance sandwich composite sheet with variable tensile strength, tensile modulus and flexural strength for versatile applications.
4. Utilisation of industrial waste particulates as an additives, catalyst, binder, filler and smooth surface finish and decorative agent in making lightweight composites.
5. Utilisation of agro-waste as core materials for making sandwich composites.
6. Development of a new class of lightweight solid composites without sandwich component that can be fabricated in a two operation mode.
7. Development of a Green sandwich composite(s) with polyurethane core which is moisture resistant and free from insects, fungus, and termite.
8. Unique approach for making a unique sandwich composite(s) for various applications and achieving the techno-economic viability together with environmental, social and livelihood improvement.

We claim:

1. A process for making a glossy finish sandwich composite, the process comprising the steps of:
   a. dry and wet processing of inorganic industrial waste particulates, wherein the inorganic industrial waste particulates are selected from a group consisting of marble waste, fly ash, lime, gypsum rich wastes mineral, metallurgical, chemical, fertiliser wastes, glass fibre reinforced plastic (GRP) waste and silica fume waste, to obtain processed inorganic industrial waste particulates; dry and wet processing of chopped natural fibres and synthetic fibres, wherein the natural fibres are selected from a group consisting of sisal fibre, jute fibre, banana fibre, flax, cotton, and hemp fibres, followed by hot air curing to obtain the processed natural and synthetic fibres;
   b. homogeneous mixing of the processed inorganic industrial waste particulates and the processed natural and synthetic fibres with a polymer selected from a group consisting of epoxy resin, polyester and polyurethane resin, along with a catalyst to prepare a glossy finish reinforced polymeric skin composite material;
   C. casting the glossy finish reinforced polymeric skin composite material under compression moulding to form first and second glossy finish reinforced polymeric skin composite sheets;
   d. demoulding the first and second glossy finish reinforced polymeric skin composite sheet;
   e. curing the first and second glossy finish reinforced polymeric skin composite sheet of step d in a natural or a hot air oven;
   f. subjecting polyurethane foam to injection moulding or subjecting agro-wastes reinforced polymeric materials to compressive moulding to form an inner core material between the first and second glossy finish reinforced polymeric skin composite sheets of step e to obtain a glossy finish sandwich composite;
   g. casting the glossy finish sandwich composite of step f under compression moulding; and
   h. demoulding the glossy finish sandwich composite of step g and curing the glossy finish sandwich composite in a hot air oven.

2. The process as claimed in claim 1, wherein the inorganic industrial waste particulates are processed using hot water, mechanical grinding and hot air oven curing at 60-80° C. for 2-24 hours; and the processed inorganic industrial waste particulates have a size in a range of 2.0-200 µm, density in a range of 0.85-1.87 g/cc, porosity in a range of 30-68% and water holding capacity in a range of 25 to 110%; and the chopped natural fibres and synthetic fibres are processed using hot water and hot air curing at 60-105° C. for 2-24 hours; and the processed natural and synthetic fibres have a density in a range of 1.25-1.45 g/cc, elongation in a range of 0.3-5.0%, tensile strength in a range of 250-650 MPa and Young's modulus in a range of 5-35 GPa.

3. The process as claimed in claim 1, wherein 20-80 wt % of the processed inorganic industrial waste particulates and 2-15% processed natural and synthetic fibres are homogeneously mixed with the polymer to prepare the glossy finish reinforced polymeric skin composite material.

4. The process as claimed in claim 1, wherein the polymer of step b is an epoxy resin or a polyester resin in a volume ratio ranging from 15-35%, and wherein the catalyst is selected from methyl ethyl ketone peroxide (MEKP) and cobalt naphthenate (0.5-5 wt %).

5. The process as claimed in claim 1, wherein the mixing in step b is performed at a rate of 400-4000 rpm.

6. The process as claimed in claim 1, wherein the casting is performed at a temperature in a range of 16±2° C. -75±2° C. and a pressure in a range of 2-295 kg/cm$^2$; and the curing in hot air oven is performed at a temperature in a range of 60 -120° C. for 2-24 hours.

7. The process as claimed in claim 1, wherein the polymer of step b is polyurethane resin in a volume ratio ranging from 20-80 wt %, and wherein the catalyst is poly-isocyanate in a range of 0.5-5 wt %.

* * * * *